(12) United States Patent
Xu et al.

(10) Patent No.: US 9,723,948 B2
(45) Date of Patent: Aug. 8, 2017

(54) WOK LID CONTROL APPARATUS APPLICABLE IN FULLY AUTOMATED COOKING MACHINE

(71) Applicants: Jinbiao Xu, Guangzhou (CN); Guang He, Shenzhen (CN)

(72) Inventors: Jinbiao Xu, Guangzhou (CN); Guang He, Shenzhen (CN)

( * ) Notice: Subject to any disclaimer, the term of this patent is extended or adjusted under 35 U.S.C. 154(b) by 245 days.

(21) Appl. No.: 14/429,361

(22) PCT Filed: Mar. 8, 2013

(86) PCT No.: PCT/CN2013/072328
§ 371 (c)(1),
(2) Date: Mar. 19, 2015

(87) PCT Pub. No.: WO2014/131211
PCT Pub. Date: Sep. 4, 2014

(65) Prior Publication Data
US 2015/0216358 A1    Aug. 6, 2015

(30) Foreign Application Priority Data
Feb. 28, 2013 (CN) .......................... 2013 1 0064081

(51) Int. Cl.
*A47J 37/10* (2006.01)
*A47J 36/06* (2006.01)
*A47J 36/10* (2006.01)

(52) U.S. Cl.
CPC .............. *A47J 36/06* (2013.01); *A47J 36/10* (2013.01)

(58) Field of Classification Search
CPC .. A47J 36/06; A47J 36/10; A47J 47/01; A47J 37/101; A47J 37/108; A47J 27/14
USPC ................. 99/339, 340, 357, 403, 426, 427; 366/144, 146, 147, 185
See application file for complete search history.

(56) References Cited

U.S. PATENT DOCUMENTS

| | | | | |
|---|---|---|---|---|
| 2,762,275 A * | 9/1956 | Burman | ................. | B31B 49/00 493/113 |
| 4,503,502 A * | 3/1985 | Chapin | ................... | A47J 27/14 700/90 |
| 5,088,390 A * | 2/1992 | Wong | ...................... | A47J 43/04 99/327 |
| 6,719,851 B1 * | 4/2004 | Kurita | ................ | C23C 16/4407 118/715 |
| 6,843,166 B1 * | 1/2005 | Li | ............................ | A47J 27/14 99/327 |
| 7,011,013 B2 * | 3/2006 | Leason | ................ | A47J 36/165 99/339 |

(Continued)

*Primary Examiner* — Thien S Tran

(57) ABSTRACT

A wok lid control apparatus (3) comprises a machine frame (100), a base (11), a drive mechanism (12) and a follow-up mechanism (13). The drive mechanism (12) comprises a linear motor (21), a connecting rod (22) and a wok lid holder (23). The follow-up mechanism (13) comprises a wok lid shaft (31), a bearing (32), and an elastic component (33). The wok lid holder (23) is provided with a through hole (231) for the wok lid shaft (31) to run through. A lower end of the wok lid shaft (31) is fixedly connected to a wok lid (20), while an upper end of the wok lid shaft protrudes through the through hole (231). An upper end of the elastic component (33) is connected to the bearing (32), and a lower end of the elastic component (33) is connected to the wok lid (20).

10 Claims, 14 Drawing Sheets

(56) References Cited

U.S. PATENT DOCUMENTS

| | | | | |
|---|---|---|---|---|
| 7,930,973 | B2* | 4/2011 | Wong | A47J 36/165 |
| | | | | 366/144 |
| 8,276,506 | B2* | 10/2012 | Tojo | A47J 36/165 |
| | | | | 99/325 |
| 2001/0015033 | A1* | 8/2001 | Minami | E05F 3/102 |
| | | | | 49/324 |
| 2007/0075078 | A1* | 4/2007 | Kim | A47J 27/56 |
| | | | | 220/203.29 |
| 2015/0305541 | A1* | 10/2015 | Wassmus | A47J 37/128 |
| | | | | 220/573.1 |

* cited by examiner

WOK LID CONTROL APPARATUS APPLICABLE IN FULLY AUTOMATED COOKING MACHINE

FIELD OF THE INVENTION

The invention relates to an intelligent home appliance, more particularly, to a wok lid control apparatus applicable in a fully automated cooking machine.

BACKGROUND OF THE INVENTION

Chinese cuisine has a tremendous range of flavors and styles. The basic cooking techniques include stir frying, stewing, deep frying, boiling, steaming, pan frying, roasting braise, and so on. The essence of cuisine is the mixture and heating of the ingredients, thus a variety of dishes can be made by changing the ingredients and heating intensity. However, up to now, cooking involves a lot of manual labor and relies very much on the cook's experiences and skills.

There exists some automated cooking machines; however, they normally cannot automatically close the wok lid to cover the wok, which means a cook has to close the wok lid himself during cooking. Some other automated cooking machines can automatically close the wok lid, but the closing of the wok lid relies completely on the gravity of the wok lid, these cooking machines thus often have problems of poor sealing and low efficiency.

SUMMARY OF THE INVENTION

The embodiments of the present application are aiming at providing a wok lid control apparatus applicable in a fully automated cooking machine, which can automatically open/close the wok lid under the control of a master control device of a fully automated cooking machine.

In order to achieve the above objective, the embodiments of the present invention provide a wok lid control apparatus applicable in a fully automated cooking machine, which comprises a machine frame, a base, fixed onto the machine frame, a drive mechanism, mounted to the base, comprising a linear motor, a connecting rod and a wok lid holder, the linear motor comprising a stator fixed to the base and a rotor moving up and down relative to the stator, the connecting rod connecting the rotor and the wok lid holder, and a follow-up mechanism, comprising a wok lid shaft, a bearing, and an elastic component, the wok lid holder being provided with a through hole for the wok lid shaft to run through, a lower end of the wok lid shaft being fixedly connected to a wok lid, while an upper end of the wok lid shaft protruding through the through hole; the wok lid holder being provided with a groove for receiving the bearing, the wok lid shaft being slidingly engaged with the bearing, the wok lid shaft being provided at the upper end thereof with a stopping ring engaging with the bearing to prevent the wok lid shaft from sliding out from the wok lid holder when sliding relative to the bearing; an upper end of the elastic component being connected to the bearing, and the lower end of the elastic component being connected to the wok lid;

wherein the linear motor is connected to a master control device of the cooking machine to receive a command issued by the master control device on the basis of a predetermined recipe and react accordingly to the command;

when receiving a close-lid command, the linear motor drives the rotor to move downwards so as to further drive the wok lid and the wok lid shaft to move downwards; after the wok lid has contacted an opening of the wok, the linear motor drives the rotor to continue moving downwards, so that the wok lid holder and the bearing both slide downwards relative to the wok lid shaft to press the elastic component until the opening of the wok is tightly sealed by the wok lid;

when receiving an open-lid command, the linear motor drives the rotor to move upwards so as to further drive the wok lid holder and the wok lid shaft to move upwards, so that the wok lid is lifted up away from the opening of the wok.

Preferably, the bearing comprises an inner ring, an outer ring and rolling elements provided therebetween, the wok lid shaft is rollingly engaged with the inner ring, the inner ring is connected to the upper end of the elastic component; when the wok that is tightly sealed by the wok lid rotates under the control of a rotating device, the wok lid, the wok lid shaft, the elastic component and the inner ring all rotate synchronously with the wok.

Preferably, the base is provided with a slide rail, and the wok lid holder is provided with a slide block.

Preferably, the base is provided with two position controlling detectors, a first position controlling detector and a second position controlling detector, to detect whether the wok lid tightly seals the opening of the wok or is away from the opening of the wok and then send detection results to the master control device; the first position controlling detector is mounted at a position that faces a bottom of the wok lid holder when the wok lid is in its initial position, and the second position controlling detector is mounted at another position that faces the bottom of the wok lid holder when the wok lid tightly seals the opening of the wok.

Preferably, a first bearing, a second bearing, a first groove and a second groove are provided, the first groove is close to a top of the wok lid holder and receives the first bearing, the second groove is close to a bottom of the wok lid holder and receives the second bearing, the first bearing engages with the stopping ring, and the second bearing is connected to the elastic element.

Preferably, the top and the bottom of the wok lid are respectively provided with a first opening and a second opening, a diameter of the first opening is smaller than that of the first groove, a diameter of the second opening is smaller than that of the second groove, and a part of the first bearing and second bearing is exposed.

Preferably, the wok lid holder comprises a cylinder, a left arm and a right arm, the cylinder is provided with the through hole at the center thereof, the left arm and the right arm extend from the cylinder to two directions, the left arm is connected to the rotor via the connecting rod, the right arm is provided with a slide block, and the base is provided with a slide rail for slidingly engaging with the slide block.

Preferably, two elastic components are provided, the two elastic components are respectively placed at two sides of the wok lid shaft and have a same distance from the wok lid shaft.

Preferably, the stator comprises a shell and a magnet within the shell, and the rotor comprises an iron core and a coil around the iron core.

Preferably, the wok lid shaft is a hollow shaft, the hollow shaft receives a plurality of guide tubes through which various liquid seasonings may be guided into the wok even when the opening of the wok is tightly sealed by the wok.

The wok lid control apparatus applicable in a fully automated cooking machine provided by the embodiments of the present invention has the following advantages:

1. High level of automation. With the master control device of the cooking machine, the wok lid control apparatus provided by the embodiments of the present invention can automatically close/open the wok lid for different dishes according to the recipes.

2. High level of tightness. Due to the compressed elastic component, the wok lid is allowed to seal tightly the opening of the wok and is allowed to rotate as the wok rotates, such that a good sealing performance can be achieved.

BRIEF DESCRIPTION OF THE DRAWINGS

FIG. 5 is an enlarged schematic diagram showing a part of the wok lid control apparatus illustrated in FIG. 3a.

DETAILED DESCRIPTION OF ILLUSTRATED EMBODIMENTS

The technical solutions in the embodiments of the present invention are clearly and completely described in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
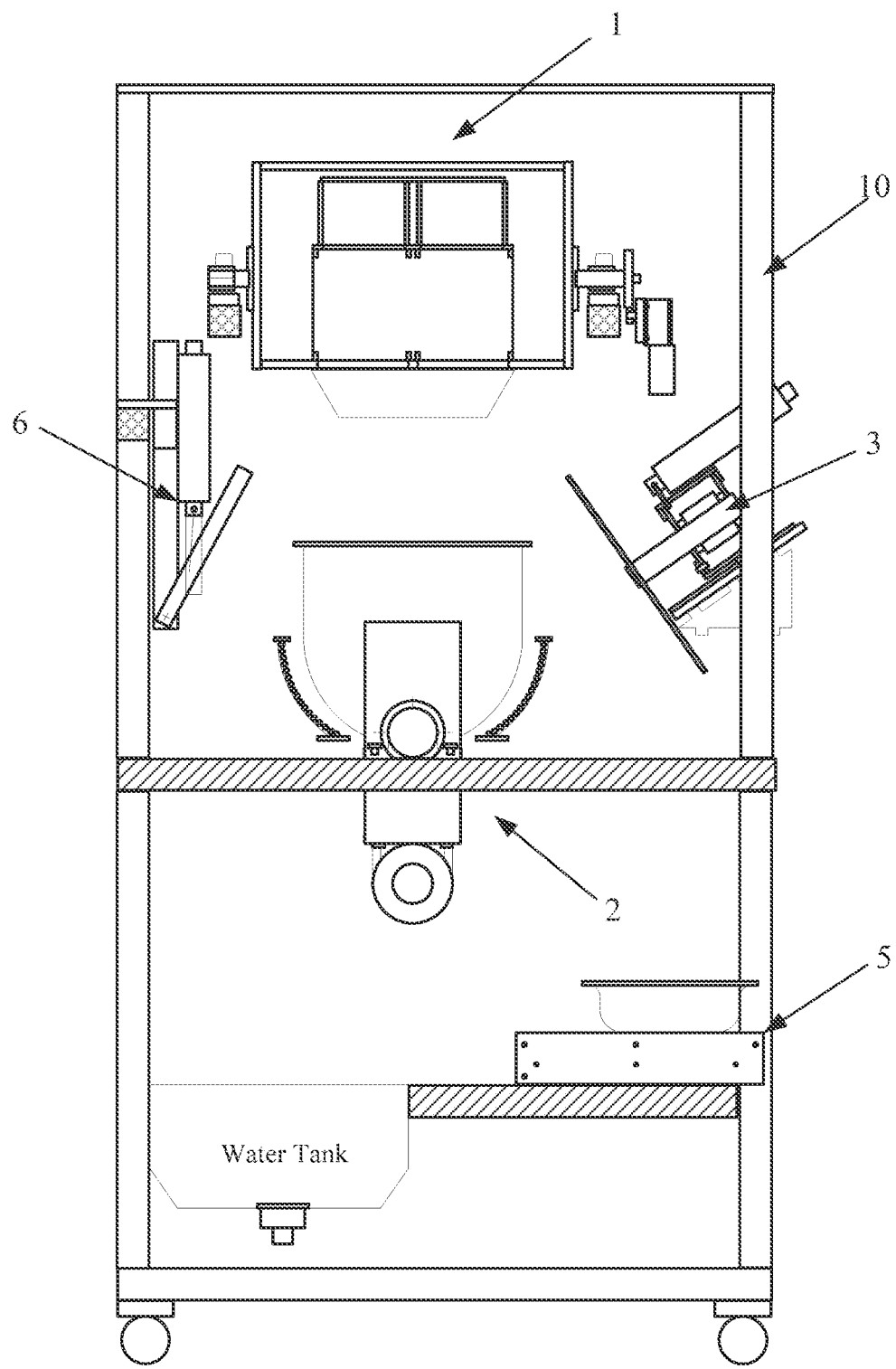
FIG. 1 is a schematic diagram showing the structure of a cooking machine with a wok lid control apparatus according to an embodiment of the present invention.
Figure 2:
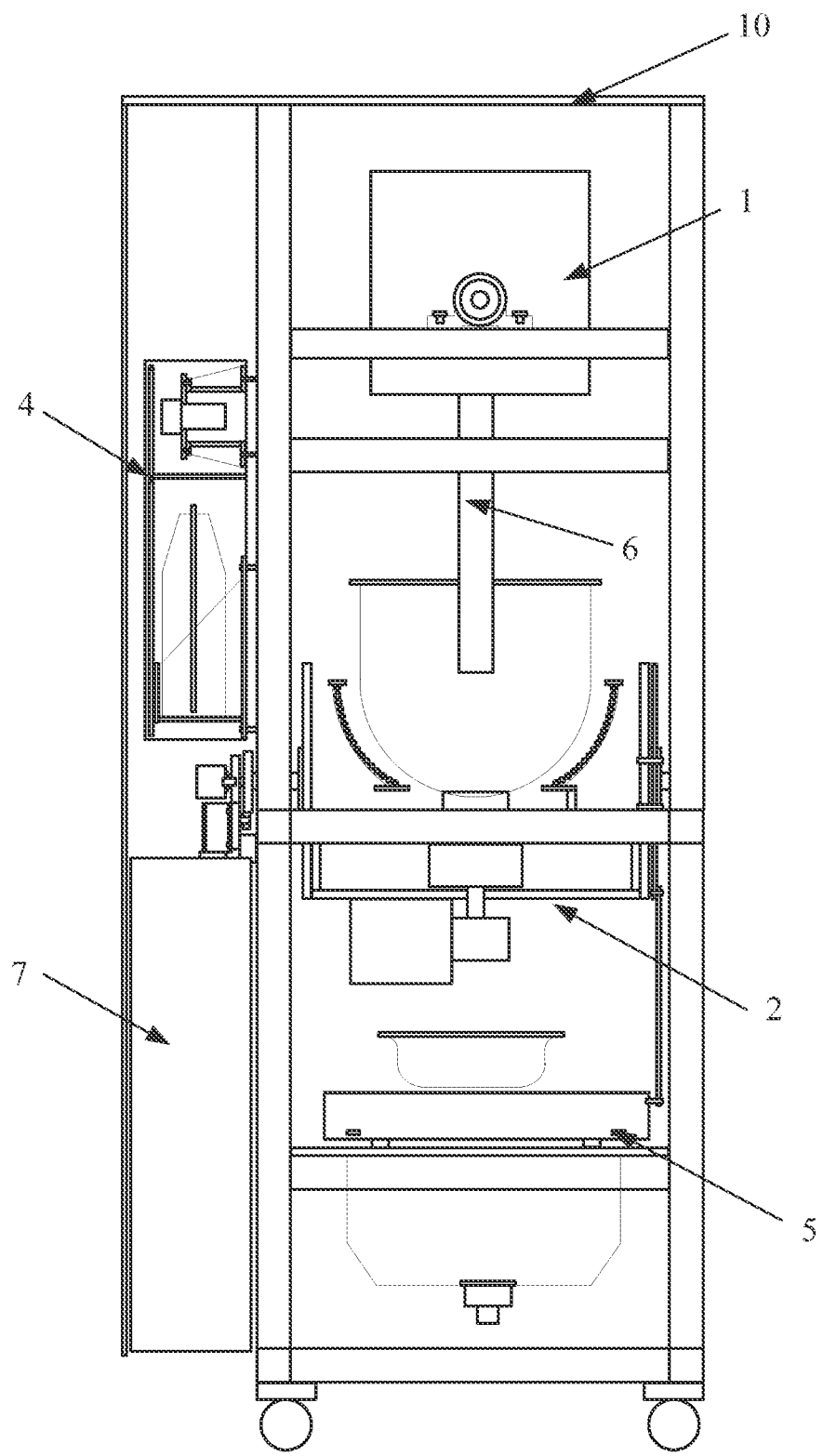
FIG. 2 is another schematic diagram showing the structure of the cooking machine illustrated in FIG. 1.

Referring to FIG. 1 and FIG. 2, the wok lid control apparatus provided by the embodiments of the present invention is applicable in a fully automated cooking machine, wherein the fully automated cooking machine comprises, but is not limited to: a housing 10, an automatic ingredient feeding apparatus 1, a wok apparatus 2 (comprising a wok 30), a wok lid control apparatus 3, an automatic seasoning feeding apparatus 4, an automatic dish exporting apparatus 5, an automatic wok washing apparatus 6 and a master control device 7, wherein the master control device 7 is used for accepting a predetermined recipe and issuing commands on the basis of the predetermined recipe. The automatic ingredient feeding apparatus 1, the wok apparatus 2, the wok lid control apparatus 3, the automatic seasoning feeding apparatus 4, the automatic dish exporting apparatus 5 and the automatic wok washing apparatus 6 are all connected to the master control device 7, they react accordingly to the command issued by the master control device 7, so as to realize an automatic cooking process.

Figure 3A:
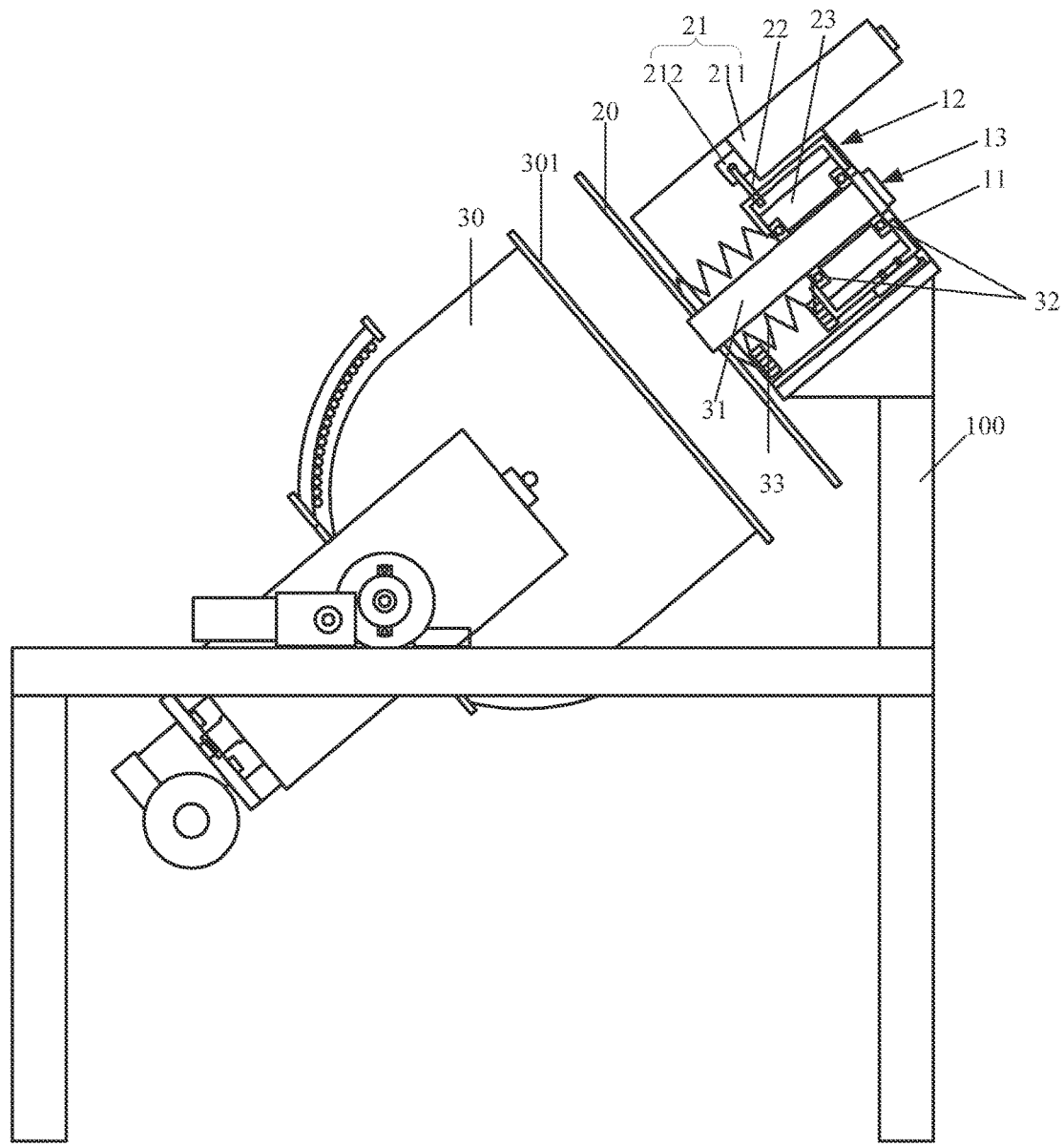
FIG. 3a-FIG. 3c are schematic diagrams showing different states of a wok lid control apparatus applicable in a fully automated cooking machine according to an embodiment of the present invention.
Figure 3B:
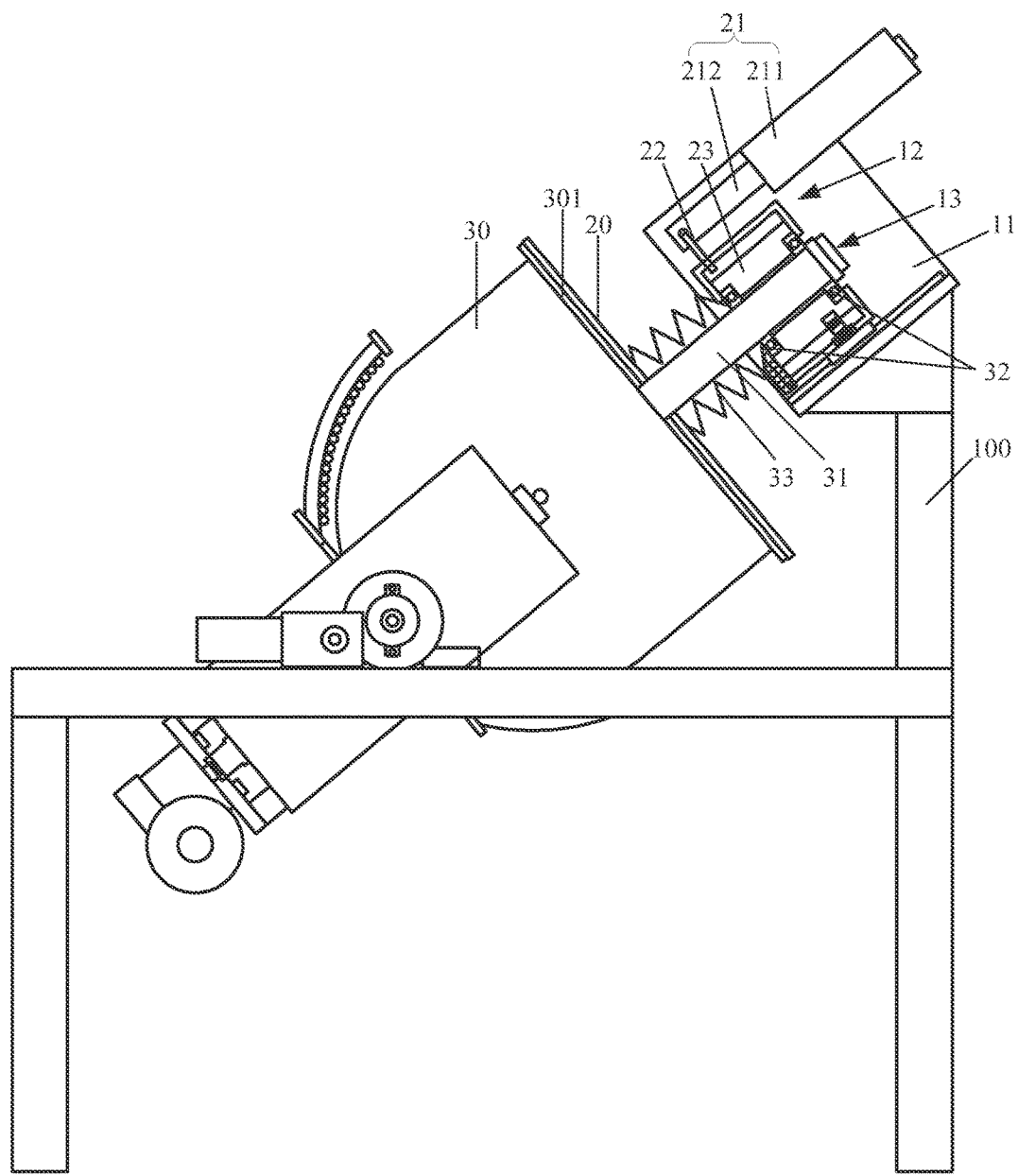
Figure 3C:
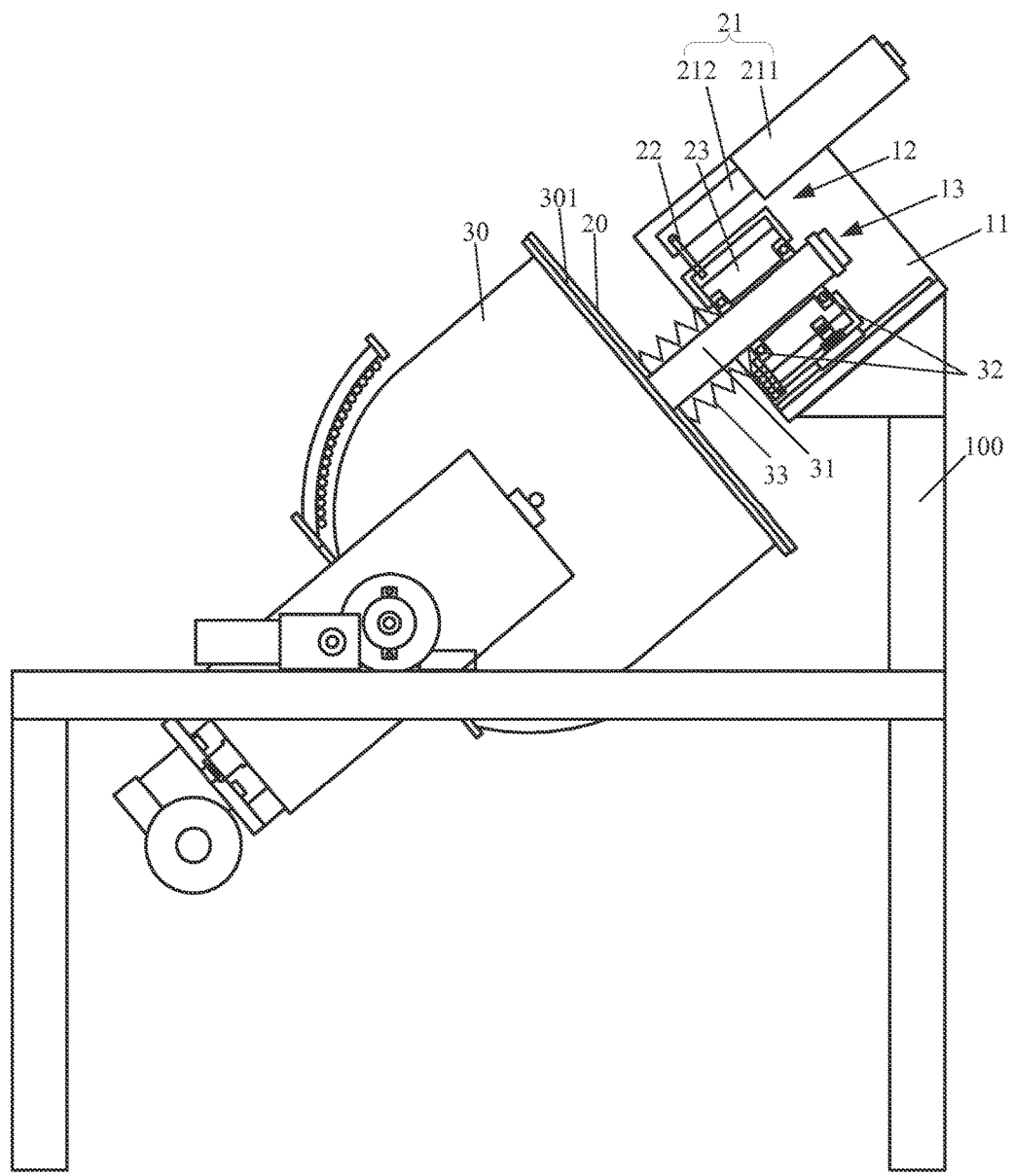

Referring to FIG. 3a-FIG. 3c, the detailed structure of the wok lid control apparatus applicable in a fully automated cooking machine according to an embodiment of the present invention will be described hereinafter. It's understandable that FIG. 3a-FIG. 3c show the structure of a same embodiment the wok lid control apparatus but in different states. The wok lid control apparatus applicable in a fully automated cooking machine provided by the embodiment of the present invention comprises a machine frame 100, a base 11 fixed onto the machine frame, a drive mechanism 12 and a follow-up mechanism 13.

The drive mechanism 12 is mounted to the base 11, the drive mechanism 12 comprises a linear motor 21, a connecting rod 22 and a wok lid holder 23. The linear motor 21 comprises a stator 211 fixed to the base and a rotor 212 moving up and down relative to the stator 211, the connecting rod 22 connects the rotor 212 and the wok lid holder 23.

The follow-up mechanism 13 comprises a wok lid shaft 31, a bearing 32, and an elastic component 33. The wok lid holder 23 is provided with a through hole 231 for the wok lid shaft 31 to run through, a lower end 311 of the wok lid shaft 31 is fixedly connected to a wok lid 20, while an upper end 312 of the wok lid shaft 31 protrudes through the through hole 231. The wok lid holder 23 is provided with a groove 232 for receiving the bearing 32, the wok lid shaft 31 is slidingly engaged with the bearing 32, the wok lid shaft 31 is provided at the upper end 312 thereof with a stopping ring 313 engaging with the bearing 32 to prevent the wok lid shaft 31 from sliding out from the wok lid holder 23 when sliding relative to the bearing 32. An upper end 331 of the elastic component 33 is connected to the bearing 32, and the lower end 332 of the elastic component 33 is connected to the top of the wok lid 20 (see FIG. 5).

Figure 4:
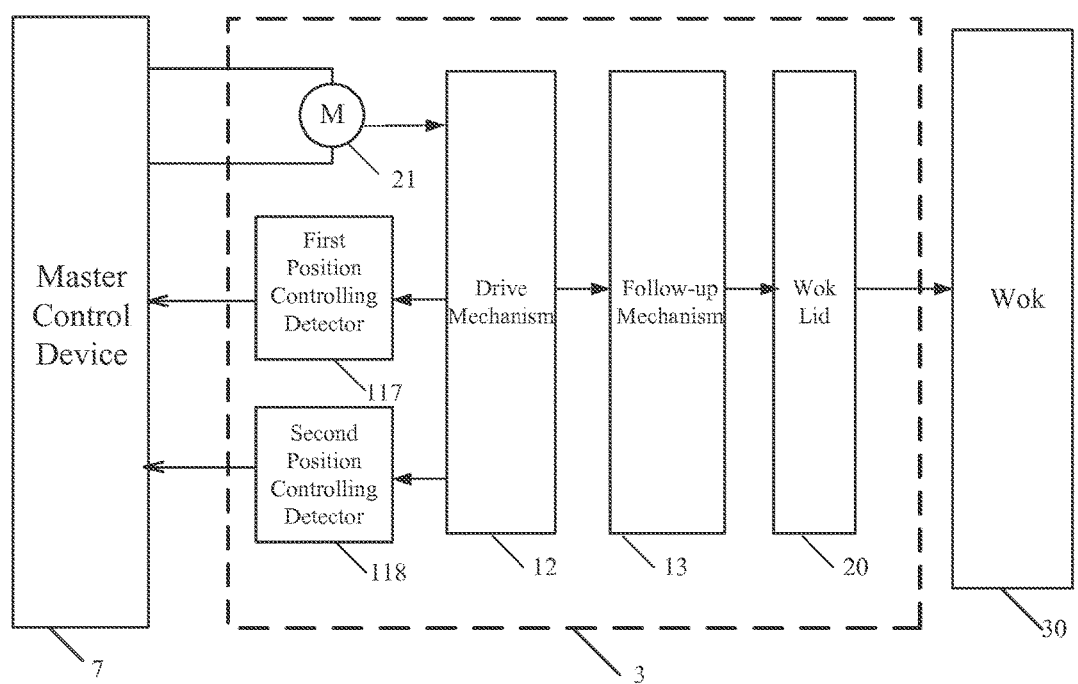
FIG. 4 is an electrical connection diagram of the wok lid control apparatus illustrated in FIG. 3.

Referring to FIG. 4, the linear motor 21 is connected to the master control device 7 to receive the command issued by the master control device on the basis of a predetermined recipe and react accordingly to the command.

When receiving a close-lid command, the linear motor 21 drives the rotor 212 to move downwards so as to further drive the wok lid holder 23, the wok lid shaft 31 and the wok lid 20 to move downwards; after the wok lid 20 has contacted an opening 301 of the wok, the linear motor 21 drives the rotor 212 to continue moving downwards, so that the wok lid holder 23 and the bearing 32 both slide downwards relative to the wok lid shaft 31 to press the elastic component 33 until the opening 301 of the wok is tightly sealed by the wok lid 20 (FIG. 3c shows the opening of the wok being tightly sealed by the wok lid).

When receiving an open-lid command, the linear motor 21 drives the rotor 212 to move upwards so as to further drive the wok lid holder 23 and the wok lid shaft 31 to move upwards, so that the wok lid 20 is lifted up away from the opening of the wok (FIG. 3a shows the wok lid being lifted up away from the opening of the wok).

Figure 5:
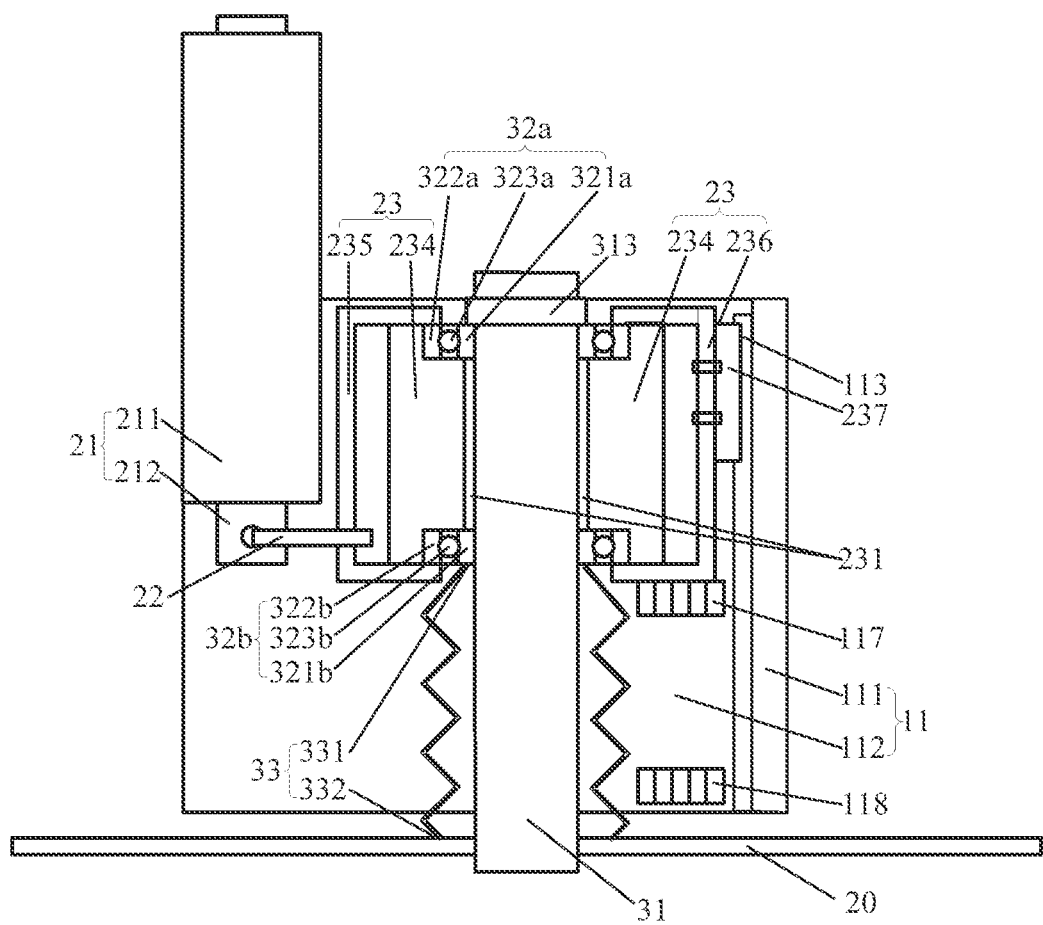
Figure 6:
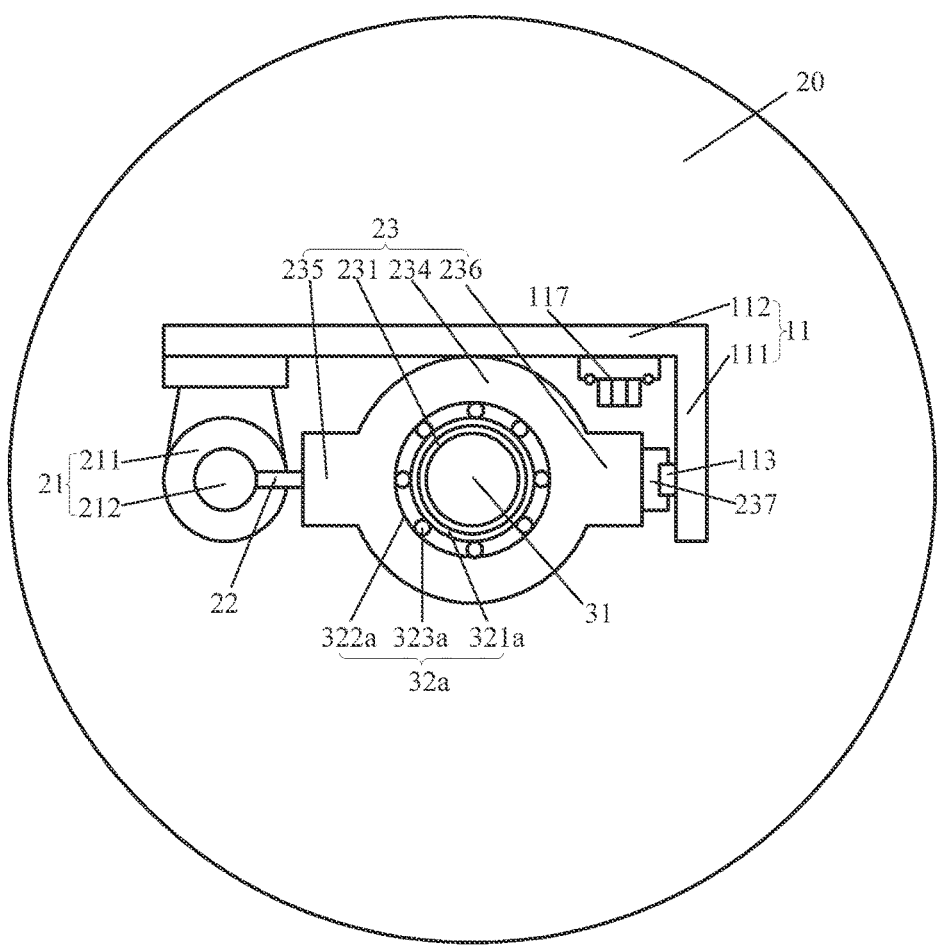
FIG. 6 is another schematic showing the wok lid control apparatus illustrated in FIG. 5.

Referring to FIG. 5-FIG. 6, in this embodiment, preferably, the base 11 comprises a joint piece 111 and a mounting piece 112, wherein the joint piece 111 connects the mounting piece 112 at right angle. The base 11 is fixed onto the machine frame 100 via the joint piece 111. The stator 211 of the linear motor 21 is fixed to the mounting piece 112. The stator 211 comprises at least a shell and a magnet within the shell. The rotor 212 comprises an iron core and a coil around the iron core. The linear motor 21 can convert electrical energy directly to mechanical energy for linear motion. In this way, by controlling the power supply of the linear motor 21, the master control device can control the movement time and movement distance of the rotor 212.

Figure 7:
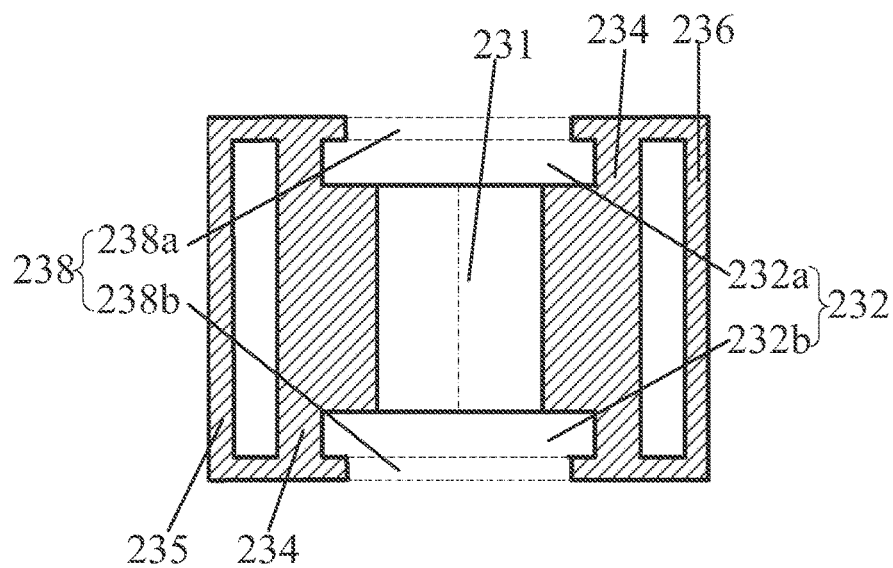
FIG. 7 is a schematic diagram showing the structure of a wok lid holder of the wok lid control apparatus illustrated in FIG. 5.

Referring to FIG. 7, preferably, the wok lid holder 23 comprises a cylinder 234, and a left arm 235 and a right arm 236 that are molded integrally with the cylinder 234, the cylinder 234 is provided with the through hole 231 at the center thereof, the diameter of the through hole 231 is a little bit bigger than the diameter of the wok lid shaft. The left arm 235 and the right arm 236 extend from the cylinder 234 to two directions. The left arm 235 is connected to the rotor 212 via the connecting rod 22, the right arm 236 is provided with a slide block 237, and the joint piece 111 of the base 11 is provided with a slide rail 113 for slidingly engaging with the slide block 237. Driven by the rotor 212 of the linear motor 21, the wok lid holder 23 can move upwards or downwards relative to the base 11. The cylinder 234 of the wok lid holder 23 is provided with two openings 238 (an upper opening 238a and a lower opening 238b). To be more specific, the upper opening 238a is provided at the top of the cylinder 234 of the wok lid holder 23, while the lower opening 238b is provided at the bottom of the cylinder 234 of the wok lid holder 23. The cylinder 234 of the wok lid holder 23 is further provided with two grooves (an upper groove 232a and a lower groove 232b). To be more specific, the upper groove 232a is provided in the cylinder 234 of the wok lid holder 23 and near the upper opening 238a, while the lower groove 232b is provided in the cylinder 234 of the wok lid holder 23 and near the lower opening 238b. The upper groove 232a is used for receiving an upper bearing 32a, and the lower groove 232b is used for receiving a lower bearing 32b. The through hole 231, the openings 238, and the grooves 232 are concentric, and the diameters of the through hole 231, the openings 238 and the grooves 232 are gradually increased, so a part of the bearings 32 is exposed.

In details, the upper bearing 32a comprises an inner ring 321a, an outer ring 322a and rolling elements 323a provided therebetween, and the lower bearing 32b comprises an inner ring 321b, an outer ring 322b and rolling elements 323b provided therebetween. When the upper bearing 32a is received in the upper groove 232a and the lower bearing 32b is received in the lower groove 232b, the outer ring 322a of the upper bearing 32a is secured to the top of the cylinder 234 and the inner ring 321a is exposed, while the out ring 322b of the lower bearing 32b is secured to the bottom of the cylinder 234 and the inner ring 321b is exposed. With the upper bearing 32a in the upper groove 232a, the inner ring 321a of the upper bearing 32a abuts against the stopping ring 313 of the wok lid shaft 31. The stopping ring 313 can prevent the wok lid shaft 31 from falling off the wok lid holder 23 when the wok lid shaft 31 is in its initial state (reset state, i.e. the wok lid is totally lifted up) or when the wok lid shaft 31 is moving up and down. Besides, when receiving a command to lift the wok lid 20, the stopping ring 313 can pass an upward force from the wok lid holder 23 to the wok lid shaft 31 so that the wok lid shaft 31 drives the wok lid 20 to move back to its initial position. The inner ring 321b of the lower bearing 32b is connected to the upper end 331 of the elastic component 33. The lower end 332 of the elastic component 33 is connected to the top of the wok lid 20. In this embodiment, the elastic component 33 comprises two springs. The two springs are respectively placed at two sides of the wok lid shaft 31 and have a same distance from the wok lid shaft 31. In the initial state (the wok lid is totally lifted up), the two springs 33 may be relaxed or stretched. When the wok lid 20 tightly seals the opening 301 of the wok, the two springs 33 are compressed.

On one hand, the wok lid shaft 31 is slidingly engaged with the inner rings 321a, 321b of the bearings 32. When the linear motor 21 receives a close-lid command, it drives the rotor 212 to move downwards so as to further drive the wok lid holder 23 and the bearings 32 to move downwards. Due to the gravity, the wok lid shaft 31 and the wok lid 20 also move downwards, so that the wok lid 20 moves towards the opening of the wok. During the downwards movement of the wok lid shaft 31 and the wok lid 20, the wok lid shaft 31 slidingly engages the inner rings 321a, 321b and creates friction to prevent the wok lid shaft 31 from falling too fast, thereby avoiding a collision between the wok lid 20 and the opening 301 of the wok.

On the other hand, the wok lid shaft 31 is rollingly engaged with the inner rings 321a, 321b. When the wok that is tightly sealed by the wok lid 20 rotates under the control of a rotating device, the wok lid 20, the wok lid shaft 31, the elastic component 33 and the inner rings 321a, 321b all rotate synchronously with the wok 20. What's more, during the synchronous rotation, due to the elastic component 33, the wok lid 20 and the opening 301 of the wok are tightly sealed all through the rotation process, in other words, the wok lid 20 won't fall apart from the opening 301 of the wok during the rotation.

In addition, in this embodiment, the base 11 is provided with a first position controlling detector 117 and a second position controlling detector 118. The first position controlling detector 117 is mounted at a position that faces a bottom of the right arm 236 of the wok lid holder 23 when the wok lid is in its initial state (reset state, i.e. the wok lid is totally lifted up from the opening of the wok) in order to detect if the wok lid is totally lifted up from the opening of the wok. The second position controlling detector 118 is mounted at another position that faces the bottom of the right arm 236 of the wok lid holder 23 when the wok lid 20 tightly seals the opening 301 of the wok in order to detect if the wok lid tightly seals the opening of the wok. The first position controlling detector 117 and the second position controlling detector 118 send their detection results to the master control device 7 (see FIG. 4). Base on the detection results, the master control device controls the power supply of the stator 221 of the linear motor 21, so as to control the movement of the rotor 212. The first position controlling detector 117 and the second position controlling detector 118 may adopt infrared detection technologies. Once the first position controlling detector 117 or the second position controlling detector 118 is blocked by the bottom of the right arm 236 of the wok lid holder 23, the first position controlling detector 117 or the second position controlling detector 118 sends a signal to the master control device accordingly.

In a preferable embodiment, the wok lid shaft 31 is a hollow shaft. The hollow shaft 131 receives a plurality of guide tubes (not shown in the figures) through which various liquid seasonings may be guided into the wok even when the opening 301 of the wok is tightly sealed by the wok lid 20.

Referring to FIG. 8a-FIG. 8c and FIG. 9a-FIG. 9c, a detailed description about a working process of a wok lid control apparatus according to an embodiment of the present invention will be described hereinafter. It should be known that in an automated cooking machine, when the master control device receives a command saying the wok lid needs to be closed, such as a close-lid command, a cooking command, an seasoning feeding command, the master control device firstly rotates the wok 30 by a specific angle to ensure that the opening 301 of the wok 30 is facing the wok lid 20 of the wok lid control apparatus, only after that, the master control device allows the wok lid control apparatus to start closing the wok lid.

In the first place, the following description will introduce how the wok lid control apparatus provided by an embodiment of the present invention closes the wok lid.

Figure 8A:
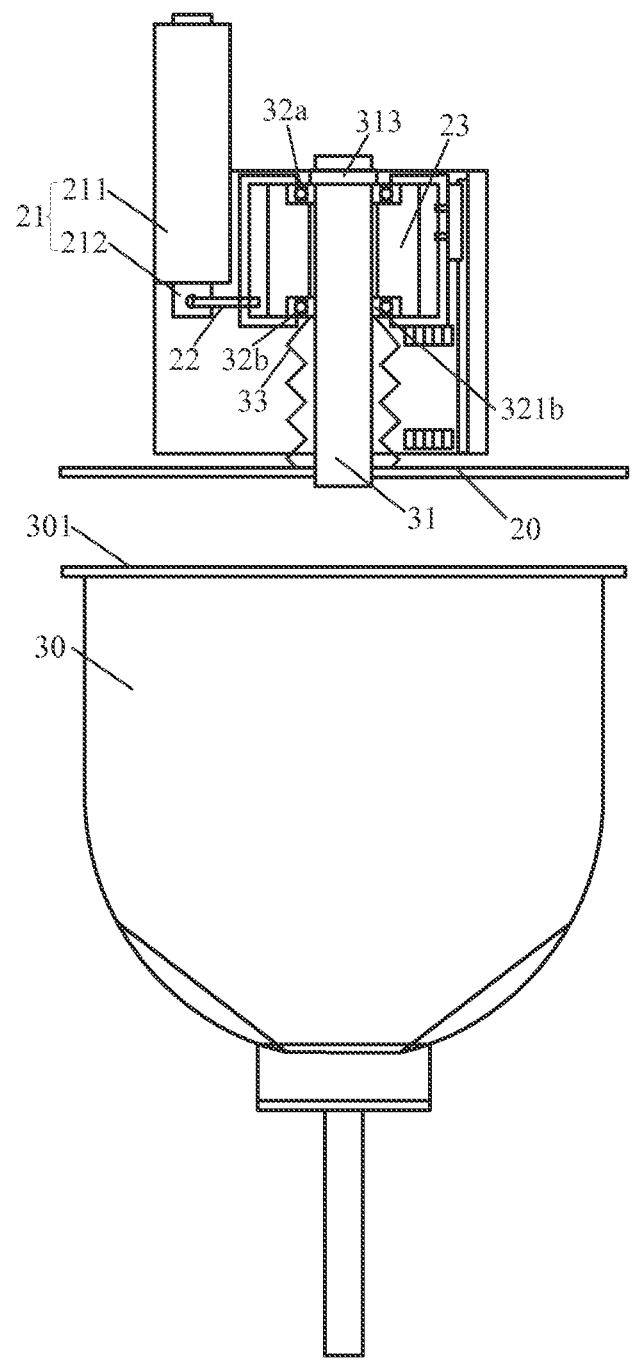
FIG. 8a-FIG. 8c showing a process of closing a wok lid according to an embodiment of the present invention.

Referring to FIG. 8a, in the initial state, the wok lid 20 is away from the opening of the wok 30 (totally lifted up), the linear motor 21 is powered off, the rotor 212 is stationary relative to the stator 211. With the connecting rod 22, the wok lid holder 23 is stationary relative to the base 11. Due to the stopping ring 313 and the upper bearing 32a (the upper bearing 32a supports the stopping ring 313), the wok lid shaft 31 and the wok lid 20 remains stationary. In the meantime, the elastic component 33 that one end of which is connected to the inner ring 321b of the lower bearing 32b while the other end of which is connected to the top of the wok lid 20 is in a relax state or in a stretched state.

Figure 8B:
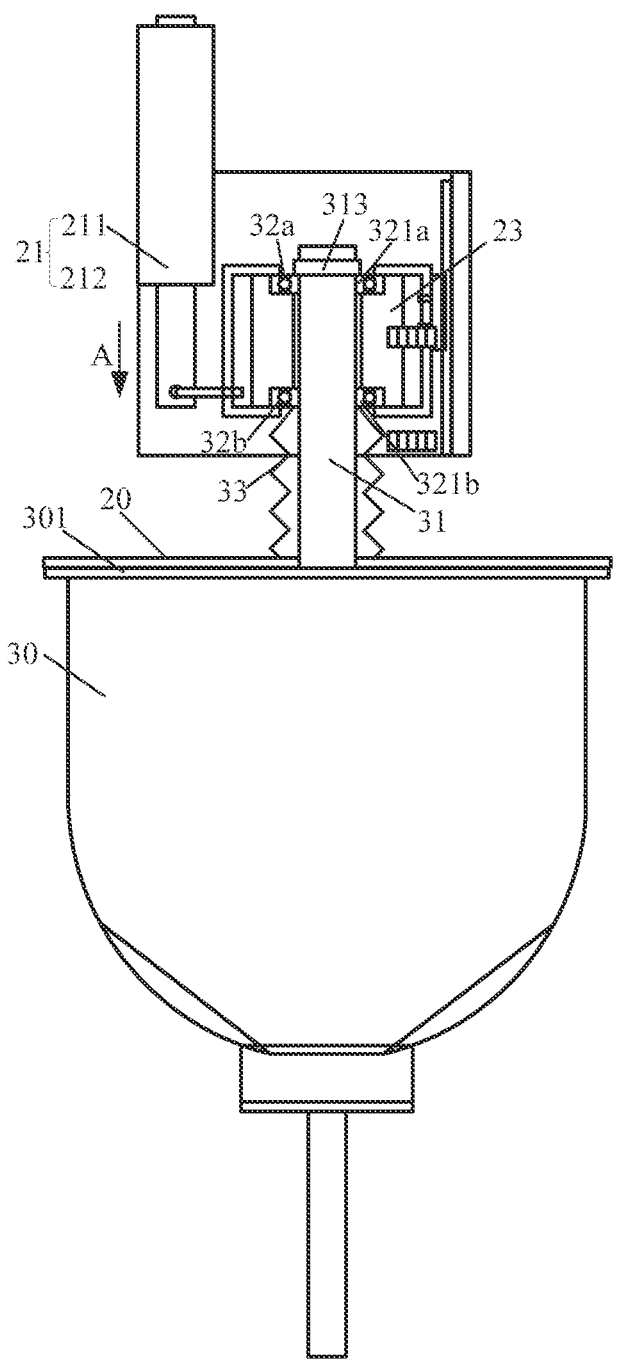

Referring to FIG. 8b, when the wok lid control apparatus receives a close-lid command, the stator 211 of the linear motor 21 is powered on. The linear motor 21 thus drives the rotor 212 to move downwards relative to the stator 211 (the moving direction is indicated by the arrow A), so as to further drive the wok lid holder 23 and the bearings 32 to move downwards. Due to the gravity, the wok lid shaft 31 and the wok lid 20 also move downwards, so that the wok lid 20 moves towards the opening 301 of the wok. During the downwards movement of the wok lid shaft 31 and the wok lid 20, the wok lid shaft 31 slidingly engages the inner rings 321a, 321b and creates friction to prevent the wok lid shaft 31 from falling too fast, that is, the wok lid 20 can move slowly towards the opening 301 of the wok until the wok lid 20 contacts the opening 301 of the wok.

Figure 8C:
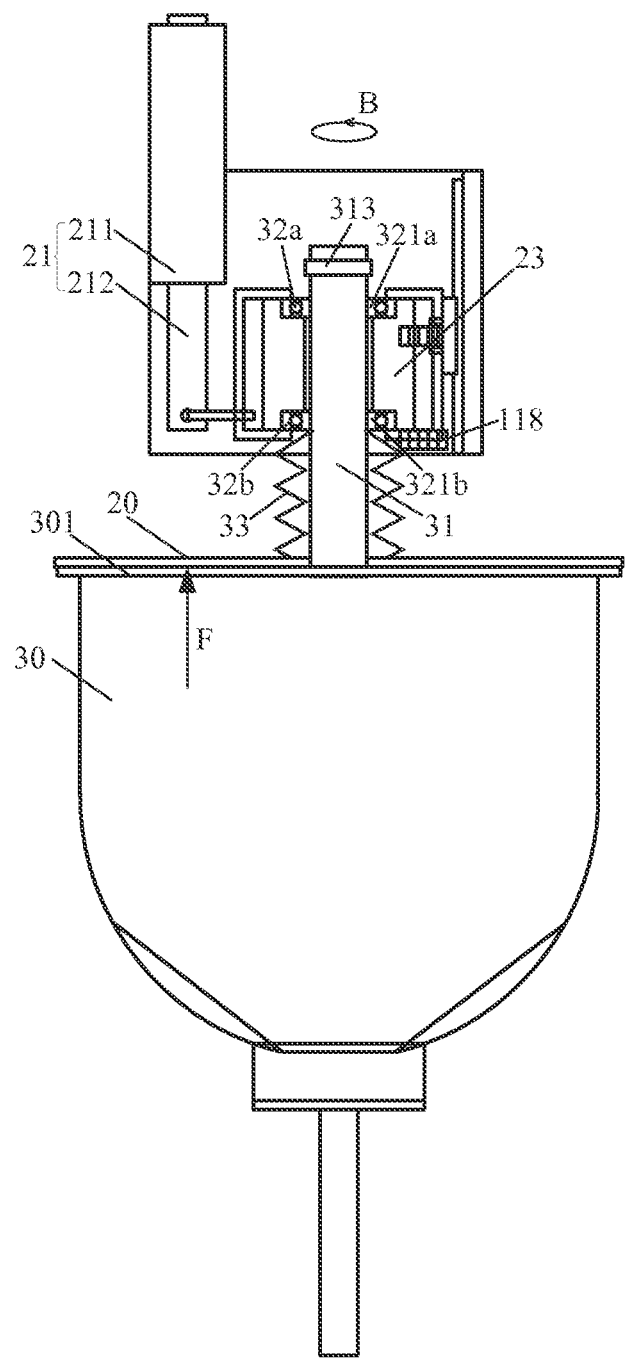

Referring to FIG. 8c, once the wok lid 20 contacts the opening 301 of the wok, the wok lid shaft 31 and the wok lid 20 are stopped from moving downwards, meanwhile, the linear motor 21 drives the rotor 212 to continue moving downwards, so that the wok lid holder 23 further drives the upper bearing 32a and the lower bearing 32b to slide downwards relative to the wok lid shaft 31 to press the elastic component 33. The compressed elastic component 33 produces a force to the wok lid 20, so that the wok lid 20 presses hard on the opening 301 of the wok. The wok lid 20 thus suffers a counterforce from the opening 301 of the wok. The direction of the counterforce is indicated by the arrow F. The second position controlling detector 118 won't send a signal to the master control device to stop the rotor 212 from moving downwards until it is blocked by the bottom of the right arm 236 of the wok lid holder 23, at this point, the opening 301 of the wok is tightly sealed by the wok lid 20. When the wok that is tightly sealed by the wok lid rotates under the control of a rotating device, the wok lid 20, the wok lid shaft 31, the elastic component 33 and the inner rings 321a, 321b all rotate synchronously with the wok (the direction of the rotation is indicated by the arrow B, it's can be understood that, the rotation can also be clockwise). What's more, during the synchronous rotation, due to the elastic component 33, the wok lid 20 and the opening 301 of the wok are tightly sealed all through the rotation process, in other words, the wok lid 20 won't fall apart from the opening 301 of the wok during the rotation.

In the second place, the following description will introduce how the wok lid control apparatus provided by an embodiment of the present invention opens the wok lid.

Figure 9A:
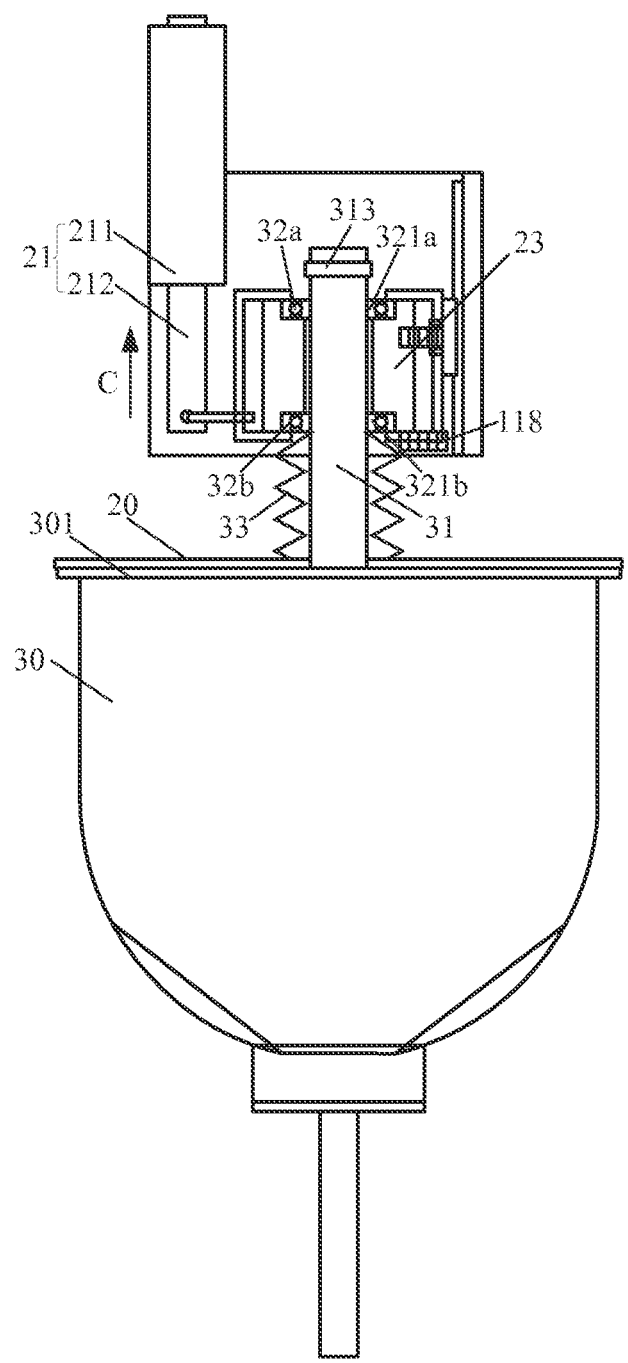
FIG. 9a-FIG. 9c showing a process of opening a wok lid according to an embodiment of the present invention.

Referring to FIG. 9a, when the opening 301 of the wok is tightly sealed by the wok 20, once the wok lid control apparatus receives an open-lid command, the stator 211 of the linear motor 21 is powered on (the current is in a direction opposite to the direction of the case shown in FIG. 8b), the linear motor 21 drives the rotor 212 to move upwards relative to the stator 211 (the moving direction is indicated by the arrow C) so as to further drive the wok lid holder 23, the upper bearing 32a and the lower bearing 32b to move upwards relative to the wok lid shaft 31.

Figure 9B:
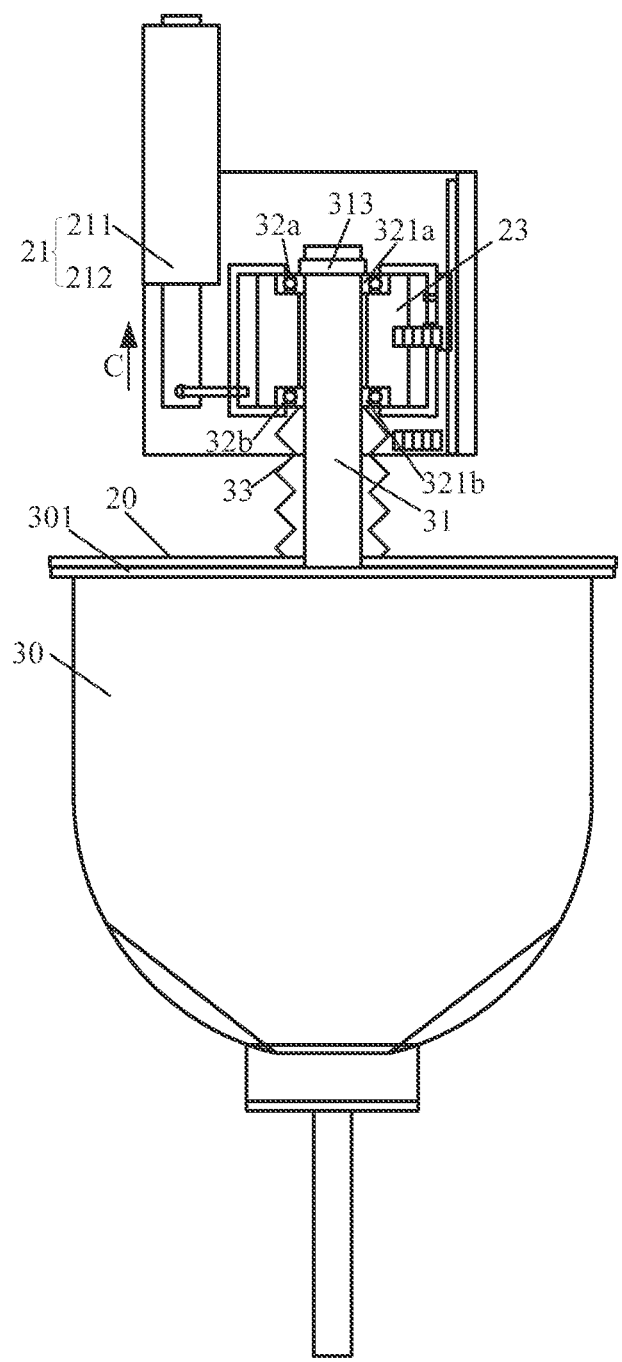

Referring to FIG. 9b, the elastic component returns to its initial state as the wok lid holder 23 moves, the inner ring 321a of the bearing 32a thus abuts against the stopping ring 313 of the wok lid shaft 31. After that, the rotor 212 keeps driving the wok lid holder 23 to move upwards, which further drive the wok lid shaft 31 and the wok lid 20 to move upwards so that the wok lid 20 is lifted up away from the opening 301 of the wok.

Figure 9C:
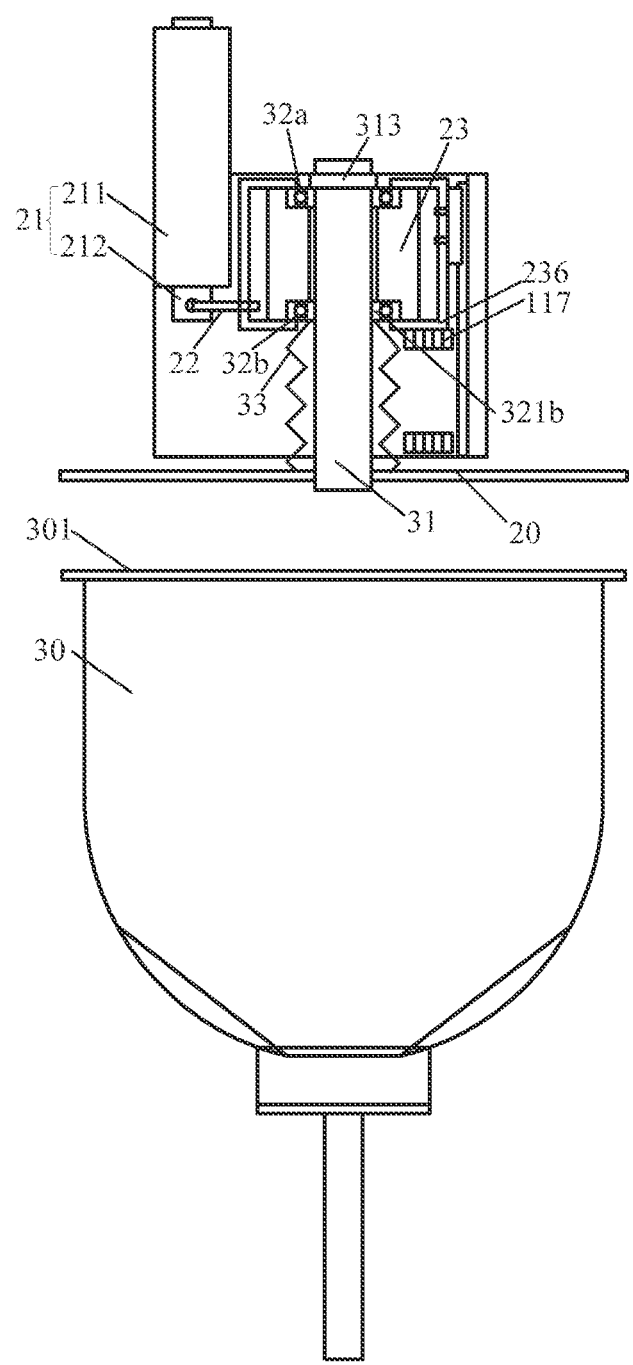

Referring to FIG. 9c, once the first position controlling detector 117 is blocked by the bottom of the right arm 236 of the wok lid holder 23, the first position controlling detector 117 sends a signal to the master device to stop the rotor 212 from moving upward, at this point, the wok lid control apparatus returns to its initial state.

In sum, the wok lid control apparatus applicable in a fully automated cooking machine provided by the embodiments of the present invention has the following advantages:

1. High level of automation. With the master control device of the cooking machine, the wok lid control apparatus provided by the embodiments of the present invention can automatically close/open the wok lid for different dishes according to the recipes 2. High level of tightness. Due to the compressed elastic component, the wok lid is allowed to seal tightly the opening of the wok and is allowed to rotate as the wok rotates, such that a good sealing performance can be achieved.

The foregoing descriptions are merely exemplary embodiments of the present disclosure, but are not intended to limit the present disclosure. Any modifications, equivalent substitutions, and improvements made within the spirit and principle of the present disclosure shall fall within the protection scope of the present disclosure.

What is claimed is:

1. A wok lid control apparatus applicable in a fully automated cooking machine, comprising
a machine frame,
a base, fixed onto the machine frame,
a drive mechanism, mounted to the base, comprising a linear motor, a connecting rod and a wok lid holder, the linear motor comprising a stator fixed to the base and a rotor moving up and down relative to the stator, the connecting rod connecting the rotor and the wok lid holder, and
a follow-up mechanism, comprising a wok lid shaft, a bearing, and an elastic component, the wok lid holder being provided with a through hole for the wok lid shaft to run through, a lower end of the wok lid shaft being fixedly connected to a wok lid, while an upper end of the wok lid shaft protruding through the through hole; the wok lid holder being provided with a groove for receiving the bearing, the wok lid shaft being slidingly engaged with the bearing, the wok lid shaft being provided at the upper end thereof with a stopping ring engaging with the bearing to prevent the wok lid shaft from sliding out from the wok lid holder when sliding relative to the bearing; an upper end of the elastic component being connected to the bearing, and a lower end of the elastic component being connected to the wok lid;
wherein the linear motor is connected to a master control device of the cooking machine to receive a command issued by the master control device based on a predetermined recipe and react accordingly to the command, when receiving a close-lid command, the linear motor drives the rotor to move downwards so as to further drive the wok lid holder and the wok lid shaft to move downwards; after the wok lid has contacted an opening of a wok, the linear motor drives the rotor to continue moving downwards, so that the wok lid holder and the bearing both slide downwards relative to the wok lid shaft to press the elastic component until the opening of wok is tightly sealed by the wok lid;

when receiving an open-lid command, the linear motor drives the rotor to move upwards so as to further drive the wok lid holder and the wok lid shaft to move upwards, so that the wok lid is lifted up away from the opening of the wok.

2. The wok lid control apparatus as claimed in claim 1, wherein the bearing comprises an inner ring, an outer ring and rolling elements provided therebetween, the wok lid shaft is rollingly engaged with the inner ring, the inner ring is connected to the upper end of the elastic component; when the wok that is tightly sealed by the wok lid rotates under the control of a rotating device, the wok lid, the wok lid shaft, the elastic component and the inner ring all rotate synchronously with the wok.

3. The wok lid control apparatus as claimed in claim 1, wherein the base is provided with a slide rail, and the wok lid holder is provided with a slide block for slidingly engaging with the slide rail.

4. The wok lid control apparatus as claimed in claim 1, wherein the base is provided with two position controlling detectors, a first position controlling detector and a second position controlling detector, to detect if the wok lid tightly seals the opening of the wok or is away from the opening of the wok and then send detection results to the master control device, the first position controlling detector is mounted at a position that faces a bottom of the wok lid holder when the wok lid is in its initial position, and the second position controlling detector is mounted at another position that faces the bottom of the wok lid holder when the wok lid tightly seals the opening of the wok.

5. The wok lid control apparatus as claimed in claim 1, wherein a first bearing, a second bearing, a first groove and a second groove are provided, the first groove is close to a top of the wok lid holder and receives the first bearing, the second groove is close to a bottom of the wok lid holder and receives the second bearing, the first bearing engages with the stopping ring, and the second bearing is connected to the elastic element.

6. The wok lid control apparatus as claimed in claim 5, wherein the top and the bottom of the wok lid are respectively provided with a first opening and a second opening, a diameter of the first opening is smaller than a diameter of the first groove, a diameter of the second opening is smaller than a diameter of the second groove, and a part of the first bearing and second bearing is exposed.

7. The wok lid control apparatus as claimed in claim 1, wherein the wok lid holder comprises a cylinder, a left arm and a right arm respectively extending from two sides of the cylinder, the cylinder is provided with the through hole at a center thereof, the left arm is connected to the rotor via the connecting rod, the right arm is provided with a slide block, and the base is provided with a slide rail for slidingly engaging with the slide block.

8. The wok lid control apparatus as claimed in claim 1, wherein two elastic components are provided, the two elastic components are respectively placed at two sides of the wok lid shaft and have a same distance from the wok lid shaft.

9. The wok lid control apparatus as claimed in claim 1, wherein the stator comprises a shell and a magnet within the shell, and the rotor comprises an iron core and a coil around the iron core.

10. The wok lid control apparatus as claimed in claim 1, wherein the wok lid shaft is a hollow shaft, the hollow shaft receives a plurality of guide tubes through which various liquid seasonings may be guided into the wok even when the opening of the wok is tightly sealed by the wok lid.

* * * * *